United States Patent
Holderle et al.

(10) Patent No.: US 8,949,065 B2
(45) Date of Patent: Feb. 3, 2015

(54) CAPACITIVE SENSOR FOR THERMOMETER PROBE

(75) Inventors: Eric B. Holderle, St. Loius, MO (US); Joseph A. Hudson, O'Fallon, MO (US)

(73) Assignee: Covidien LP, Mansfield, MA (US)

( * ) Notice: Subject to any disclaimer, the term of this patent is extended or adjusted under 35 U.S.C. 154(b) by 473 days.

(21) Appl. No.: 13/249,661

(22) Filed: Sep. 30, 2011

(65) Prior Publication Data
US 2013/0085707 A1    Apr. 4, 2013

(51) Int. Cl.
| G01K 1/00 | (2006.01) |
| G01K 11/30 | (2006.01) |
| G01K 15/00 | (2006.01) |
| G01J 5/04 | (2006.01) |
| G01J 5/02 | (2006.01) |
| G01J 5/08 | (2006.01) |

(52) U.S. Cl.
CPC .............. *G01J 5/049* (2013.01); *G01J 5/021* (2013.01); *G01J 5/026* (2013.01); *G01J 5/0893* (2013.01)
USPC .............................. 702/130; 702/135; 702/99

(58) Field of Classification Search
USPC .............. 702/130, 135, 99; 600/549; 374/100
See application file for complete search history.

(56) References Cited

U.S. PATENT DOCUMENTS

| 3,905,232 A | 9/1975 | Knute |
| 4,341,992 A | 7/1982 | Goldstein |
| 4,900,162 A | 2/1990 | Beckman et al. |
| 5,066,142 A | 11/1991 | DeFrank et al. |
| 5,167,235 A | 12/1992 | Seacord et al. |
| 5,411,032 A | 5/1995 | Esseff et al. |
| 5,487,607 A | 1/1996 | Makita et al. |
| 6,001,066 A | 12/1999 | Canfield et al. |
| 6,149,297 A | 11/2000 | Beerwerth et al. |
| 6,186,959 B1 | 2/2001 | Canfield et al. |
| 6,195,581 B1 | 2/2001 | Beerwerth et al. |
| 6,522,912 B1 | 2/2003 | Nakatani et al. |
| 6,584,426 B2 | 6/2003 | Ota |
| 6,612,735 B2 | 9/2003 | Tomioka et al. |
| 6,694,174 B2 | 2/2004 | Kraus et al. |
| 6,742,927 B2 | 6/2004 | Bellifemine |
| 7,036,978 B2 | 5/2006 | Tabata et al. |
| 7,314,310 B2 | 1/2008 | Medero |
| 7,355,178 B2 | 4/2008 | Everest |
| 7,536,568 B2 | 5/2009 | Price et al. |

(Continued)

FOREIGN PATENT DOCUMENTS

| DE | 19600334 A1 | 7/1997 |
| JP | 2000131146 A | 5/2000 |
| JP | 2000217788 A | 8/2000 |

OTHER PUBLICATIONS

European Search Report regarding related application serial No. EP 12184356.9 dated Jan. 7, 2013, 6 pgs.

*Primary Examiner* — Michael Nghiem
*Assistant Examiner* — Eman Alkafawi
(74) *Attorney, Agent, or Firm* — Lisa E. Winsor, Esq.

(57) ABSTRACT

An electronic thermometer includes a probe adapted to be heated by a subject for use in measuring a temperature of the subject. At least one temperature sensor detects a temperature of the probe. A probe sensor detects a condition at the probe. The probe sensor has an idle condition when the probe is not inserted into the subject. A processor is operatively connected to the probe sensor and programmed to monitor a change in the condition of the probe sensor from the idle condition to determine whether the probe has been received in a probe cover and inserted into the subject.

17 Claims, 8 Drawing Sheets

(56) References Cited

U.S. PATENT DOCUMENTS

| | | |
|---|---|---|
| 7,572,056 B2 | 8/2009 | Lane et al. |
| 7,813,889 B2 | 10/2010 | Quinn et al. |
| 7,815,367 B2 | 10/2010 | Lane et al. |
| 2006/0078037 A1 | 4/2006 | Lee et al. |
| 2006/0098710 A1 | 5/2006 | Kienitz |
| 2007/0242726 A1 | 10/2007 | Medero |
| 2009/0105605 A1 | 4/2009 | Abreu |
| 2009/0289698 A1 | 11/2009 | Price et al. |
| 2010/0017163 A1* | 1/2010 | Yamaguchi et al. ............ 702/99 |
| 2010/0208767 A1 | 8/2010 | Chen |
| 2010/0284436 A1* | 11/2010 | Lane et al. .................... 374/121 |
| 2010/0322282 A1 | 12/2010 | Lane et al. |
| 2011/0106484 A1* | 5/2011 | Quinn et al. .................. 702/135 |
| 2011/0134962 A1 | 6/2011 | Fraden |
| 2011/0257521 A1 | 10/2011 | Fraden |

\* cited by examiner

US 8,949,065 B2

CAPACITIVE SENSOR FOR THERMOMETER PROBE

BACKGROUND

The present invention generally relates to thermometers, and more particularly to a thermometer having a probe sensor.

Medical thermometers are typically employed to measure a subject's body temperature to facilitate the prevention, diagnosis, and treatment of diseases, body ailments, etc., for humans and other animals. An accurate reading of a subject's body temperature is required for effective use and should be taken from the internal or core temperature of a subject's body. Several thermometer devices are known for measuring a subject's body temperature, such as, for example, electronic thermometers, including tympanic thermometers.

Tympanic thermometers have a sensing probe that is inserted into a subject's cavity (e.g., ear) for measuring the subject's body temperature. Before inserting the sensing probe into the subject's cavity, a probe cover is preferably mounted onto the sensing probe to provide a sanitary barrier between the sensing probe and the subject. The probe cover is typically discarded after the subject's body temperature has been obtained.

In the case of a tympanic thermometer, the sensing probe includes a heat sensor such as a thermopile for sensing infrared emission from the tympanic membrane, or eardrum. During use, the thermopile is generally located inside the ear canal. The thermopile utilizes a waveguide of radiant heat to transfer heat energy from the eardrum to the sensor.

Often times during use, the thermometer probe is inadvertently placed into a subject's cavity without a probe cover. This exposes the thermometer to cross contamination, which compromises the ability of the thermometer to generate accurate reading and necessitates cleaning the probe. A conventional thermometer cannot detect the placement of the probe in the subject's cavity. Therefore, a need exists for a thermometer that can better promote proper usage of the thermometer, including the placement of the probe.

SUMMARY

In one aspect, an electronic thermometer generally comprises a probe adapted to be heated by a subject for use in measuring a temperature of the subject. At least one temperature sensor detects a temperature of the probe. A probe sensor detects a condition at the probe. The probe sensor has an idle condition when the probe is not inserted into the subject. A processor is operatively connected to the probe sensor and programmed to monitor a change in the condition of the probe sensor from the idle condition to determine whether the probe has been received in a probe cover and inserted into the subject.

In another aspect, a method of determining a temperature of a subject with an electronic thermometer generally comprises detecting a condition at a probe of the thermometer with a probe sensor having an idle condition when the probe is not inserted into the subject. Monitoring a change in the condition of the probe sensor from the idle condition with a processor operatively connected to the probe sensor to determine whether the probe has been received in a probe cover and inserted into the subject. And detecting a temperature of the probe inserted into the subject by using a temperature sensor to determine the temperature of the subject.

In yet another aspect, a method of determining a temperature of a subject with an electronic thermometer generally comprises measuring a condition at a probe of the thermometer with a probe sensor having an idle condition when the probe is not inserted into the subject. Programming a processor of the thermometer to identify a first condition corresponding to a first change in condition measured by the probe sensor signaling that the probe has been inserted into the subject without a probe cover disposed over the probe, and a second condition corresponding to a second change in condition measured by the probe sensor different from the first change in condition signaling that the probe has been inserted into the subject with a probe cover disposed over the probe. And detecting a temperature of the probe inserted into the subject by using a temperature sensor to determine the temperature of the subject.

Other objects and features will be in part apparent and in part pointed out hereinafter.

DETAILED DESCRIPTION OF THE DRAWINGS

The exemplary embodiments of the tympanic thermometer and methods of use disclosed are discussed in terms of medical thermometers for measuring body temperature and, more particularly, in terms of a tympanic thermometer that includes a temperature sensor for measuring body temperature when the thermometer is inserted into an ear of a subject. However, the disclosed elements can be used with other types of electronic thermometers (ex., oral and rectal thermometers) without departing from the scope of the present invention.

Figure 2:
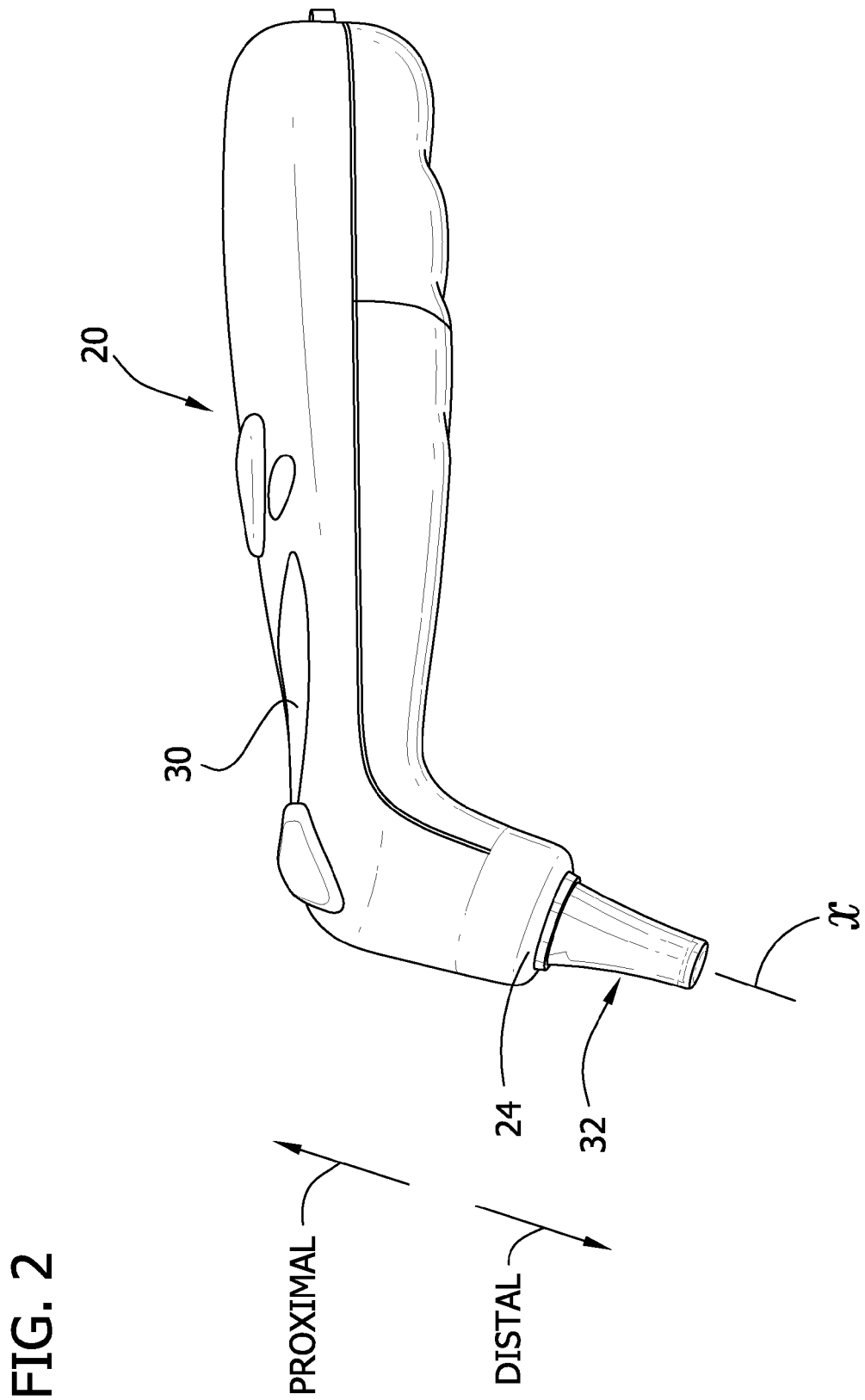
FIG. 2 is a perspective view of the tympanic thermometer shown in FIG. 1 with a probe cover disposed on a distal end of the thermometer.
Figure 3:
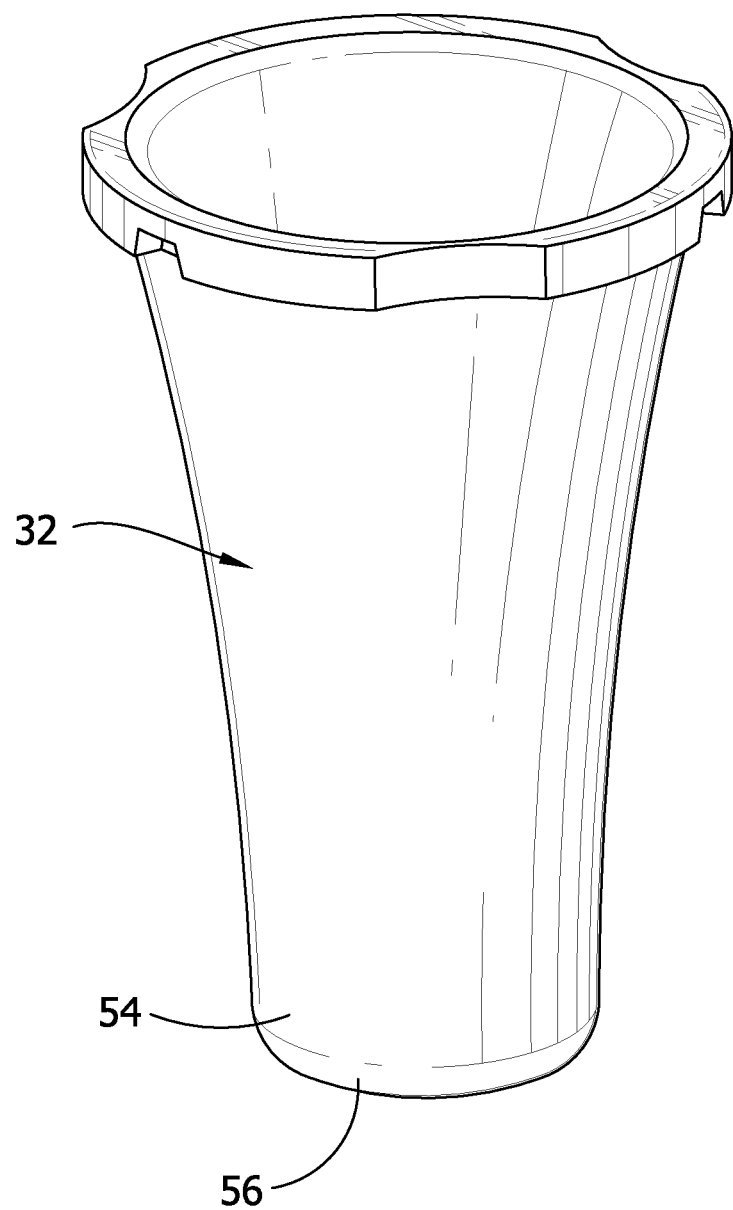
FIG. 3 is a perspective view of the probe cover shown in FIG. 2.

In the discussion that follows, the term "proximal" will refer to the portion of a structure that is closer to a practitioner, while the term "distal" will refer to the portion that is farther from the practitioner. FIG. 2 illustrates "proximal" and "distal" for the structure, which is the fully assembled and usable tympanic thermometer. As-used herein, the term "subject" refers to a human patient or other animal having its body temperature measured. According to the present disclosure, the term "practitioner" refers to a doctor, nurse, parent or other care provider utilizing a tympanic thermometer to measure a subject's body temperature, and may include support personnel.

Figure 1:
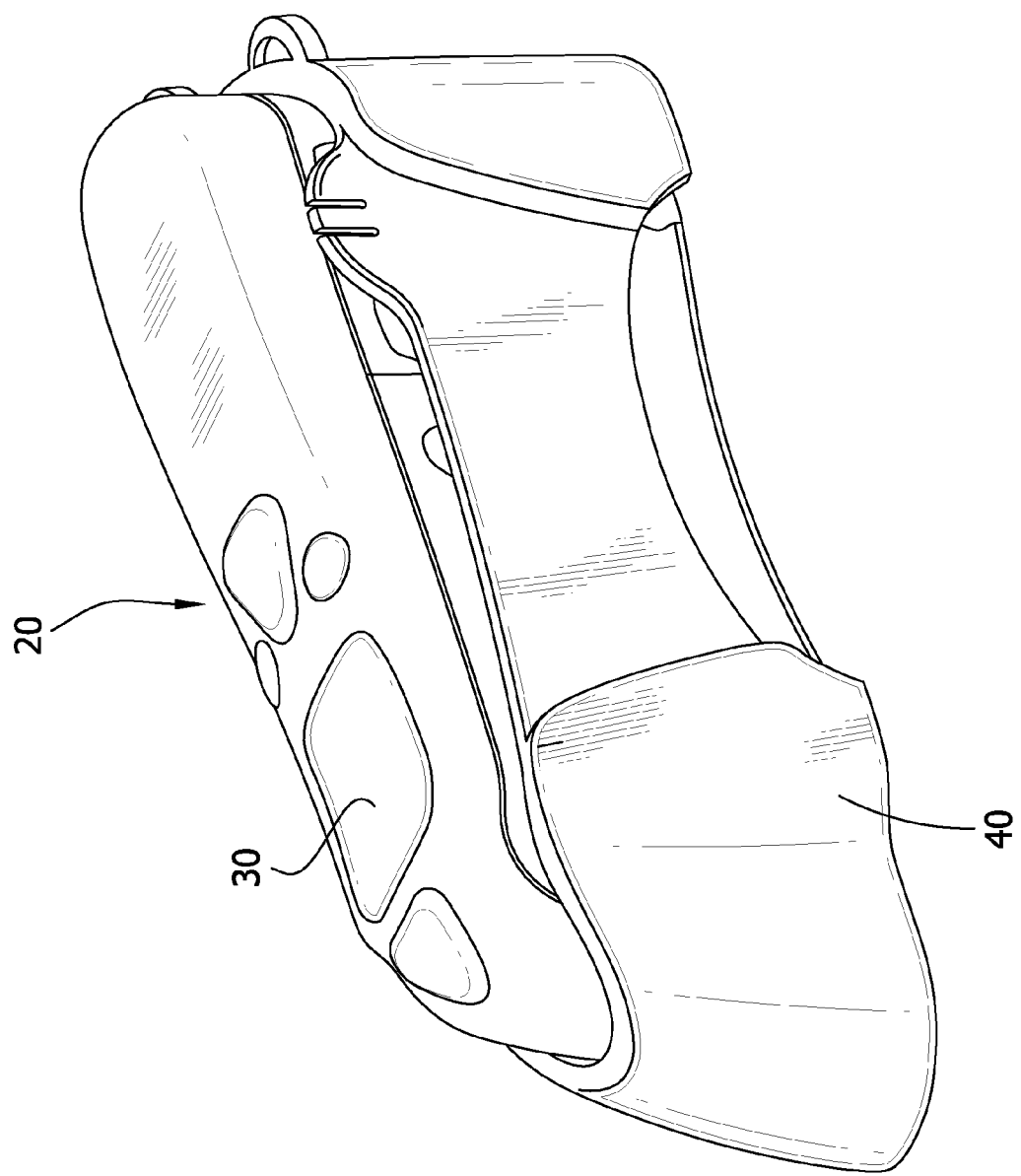
FIG. 1 is a perspective view of a tympanic thermometer, in accordance with the principles of the present disclosure, mounted on a holder.

Reference will now be made in detail to exemplary embodiments of the present disclosure, which are illustrated in the accompanying Figures. Turning now to the Figures and initially to FIGS. 1 and 2, there is illustrated a tympanic thermometer, generally indicated at 20, in accordance with the principles of the present disclosure. It is contemplated that the tympanic thermometer 20 includes the necessary electronics and/or processing components to perform temperature measurement via the tympanic membrane, as is known to one skilled in the art. It is further envisioned that tympanic thermometer 20 may include a waveguide to facilitate sensing of the tympanic membrane heat energy. However, in the illustrated embodiments, the waveguide is beneficially omitted. The tympanic thermometer 20 is releasably mounted in a holder 40 for storage in contemplation for use. The tympanic thermometer 20 and holder 40 may be fabricated from semi-rigid, rigid plastic and/or metal materials suitable for temperature measurement and related use. It is envisioned that the holder 40 may include the electronics necessary to facilitate powering the tympanic thermometer 20, including, for example, battery charging capability, etc. The thermometer 20 is operable in a sleep mode wherein the thermometer 20 conserves energy and is not capable of performing a temperature measurement and an awake mode wherein the thermometer is operating at full power and is capable of performing a temperature measurement in certain conditions as will be described in greater detail below.

Referring to FIGS. 2-5, tympanic thermometer 20 includes a cylindrical heat sensing probe, generally indicated at 22. The heat sensing probe 22 extends from a distal end 24 of tympanic thermometer 20 and defines a longitudinal axis X. The heat sensing probe 22 may have various geometric cross-sectional configurations, such as, for example, rectangular, elliptical, etc.

A probe cover 32 may be disposed over the heat sensing probe 22. The probe cover 32 has a distal end 54 that is substantially enclosed by a film 56. The film is substantially transparent to infrared radiation and configured to facilitate sensing of infrared emissions by heat sensing probe 22. The film 56 is advantageously impervious to ear wax, moisture and bacteria to prevent disease propagation. One skilled in the art, however, will realize that other materials and fabrication methods suitable for assembly and manufacture are also within the scope of the present invention.

Figure 4:
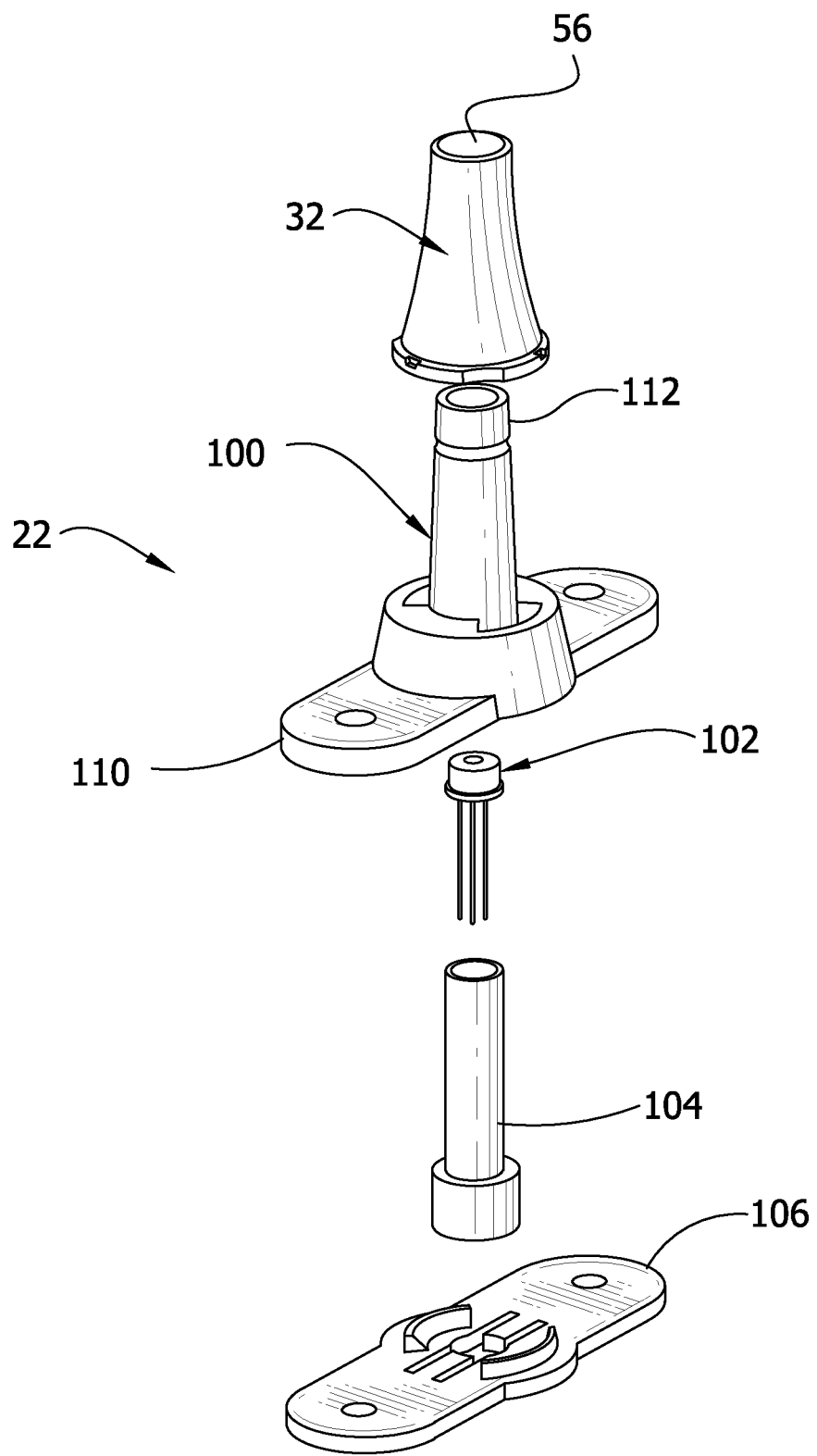
FIG. 4 is an exploded perspective view of the distal end of the tympanic thermometer shown in FIG. 2.
Figure 5:
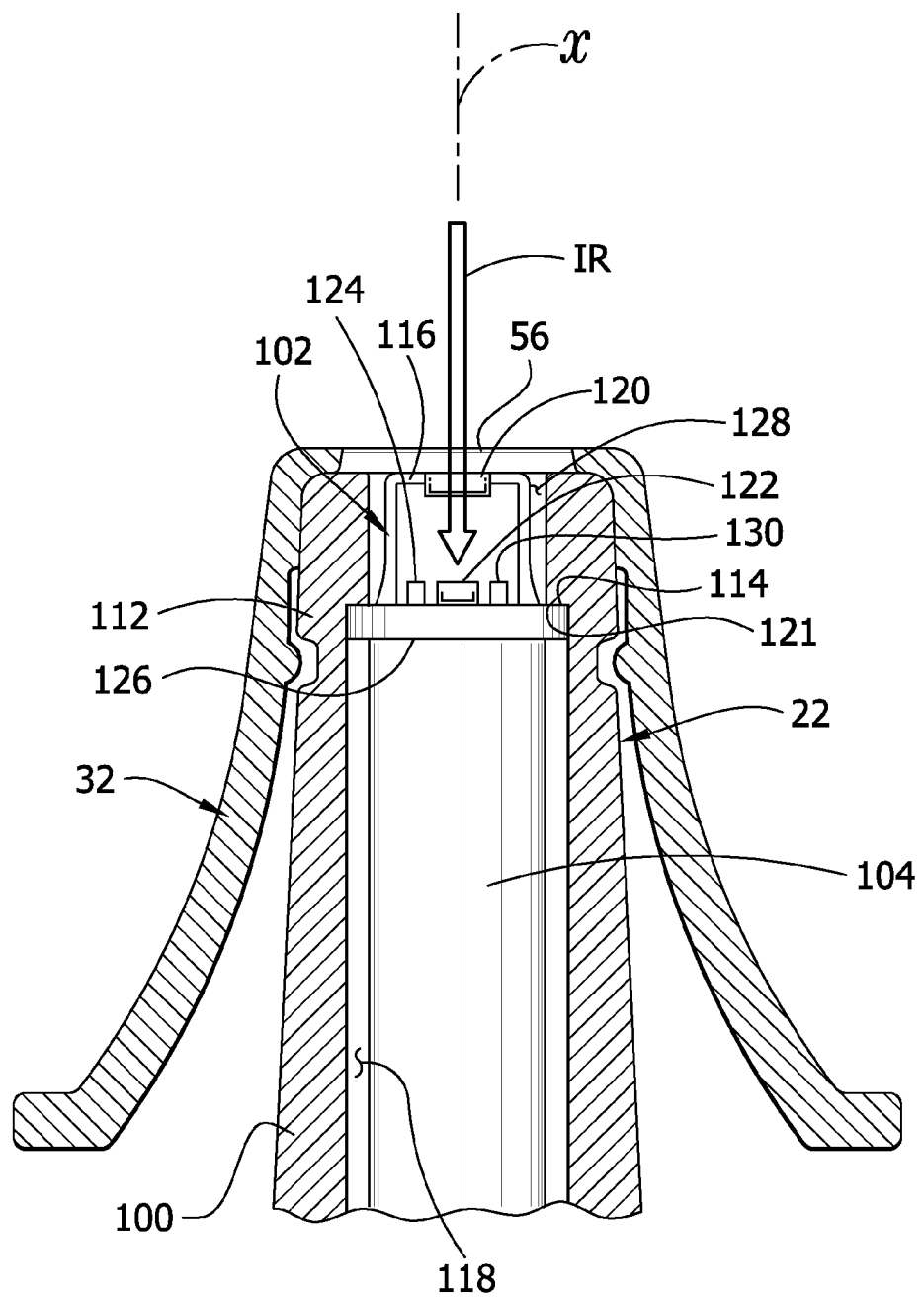
FIG. 5 is a cross-sectional and fragmentary view of the probe cover mounted on the distal end of the tympanic thermometer shown in FIG. 2.

Referring to FIGS. 4 and 5, the heat sensing probe 22 includes a nozzle, generally indicated at 100, mounted on a base 106. The nozzle 100 includes a base 110 and an elongated nose portion 112 projecting distally from the base. By way of non-limiting example, nozzle 100 may be fabricated from metal or other material which aides in the rapid exchange or transfer of heat. The nozzle 100 is formed of two parts (the base 110 and the nose portion 112) in the illustrated embodiment. It will be understood that a nozzle can be formed as one piece or more than two pieces without departing from the scope of the present invention. In particular, it is envisioned that the elongated nose section 112 can be formed of two or more pieces.

Figure 8:
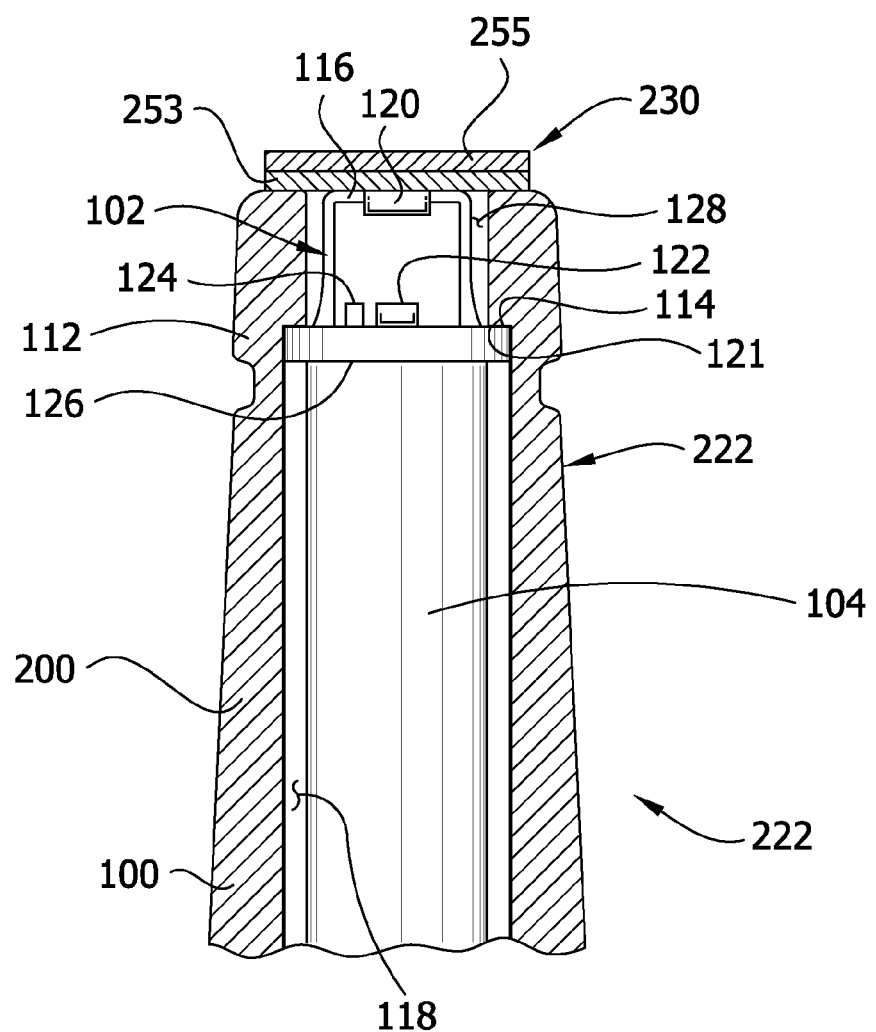
FIG. 8 is a cross-sectional and fragmentary view of the probe cover mounted on a distal end of a probe of a second embodiment a tympanic thermometer.

The heat sensing probe 22 also includes a sensor can, generally indicated at 102, attached to temperature sensing electronics mounted on a distal end of a sensor housing 104 (or "retainer") received within the nozzle 100. The can 102 includes a sensor base 126 and a generally inverted cup-shaped tip 116 mounted on the base. A temperature sensor 122 (e.g., a thermopile), an infrared filter or window 120 and thermistor 124 are housed within can 102. The sensor housing 104 is mounted on the base 106 of probe 22 such that it extends generally coaxially within nozzle 100. By way of non-limiting example, the sensor housing 104 is fabricated from materials that provide for less thermo transmission (i.e., more insulated) than the nozzle 100, for example, plastic or other similar matter. So the material of the sensor housing 104 has a low thermal conductivity as compared to the thermal conductivity of the nozzle 100 and the base 126 of the can 102. The probe may also include a probe cover film 119 (FIG. 8).

The probe cover 32 is received on the nozzle 100 such that a distal portion of the cover is in thermal contact with the nose 112 of the nozzle. Probe cover 32 may be shaped, for example, frustoconically, or shaped in a tapered manner as to allow for easier insertion into the ear of the subject and attachment and detachment from the heat sensing probe 22. The probe cover 32, which is disposable, may be fabricated from materials suitable for measuring body temperature via the tympanic membrane with a tympanic thermometer measuring apparatus. These materials may include, for example, plastic materials, such as, for example, polypropylene, polyethylene, etc., depending on the particular temperature measurement application and/or preference of a practitioner.

In operation, infrared energy IR (FIG. 5) from the subject's tympanic membrane, for example, passes through the film 56 of probe cover 32 and enters can 102 through the window 120 of probe 22. This infrared energy may heat the can 102 and create a temperature gradient across the tip 116 from its distal end to its proximal end contacting the base 126. That is, the distal end can be much warmer than the proximal end. Heat from, for example, the ear of the subject is transferred from probe cover 32 to nozzle 100 to the base 126 of the can 102 via a path of heat flux (not shown). The path of heat flux heats the can 102 in order to reduce the temperature gradient across tip 116, thereby enabling a faster and more accurate temperature reading. An internal ridge 121 engages a distal side of a peripheral edge margin 114 of the base 126 to provide a heat conducting path from the nozzle 100 to the base 126 defining the path of heat flux. It is contemplated herein that nozzle 100 may be both in physical contact with the peripheral edge margin 114 or in a close proximate relationship with peripheral edge margin 114 of can 102. In either case, there should be such thermal contact as to enable heat transfer from the internal ridge 121 of the nozzle 100 to the peripheral edge margin 114 of the base 126.

Referring to FIG. 5, a probe sensor 130 may also be disposed in the can 102. The probe sensor 130 measures a condition at the distal end of the probe 22 associated with an operating condition of the probe 22 (e.g., placement of the probe). When the probe 22 is not inserted into a subject (with or without a probe cover), the probe sensor 130 detects an idle condition at the distal end of the probe 22. In the idle condition, power is not supplied to the temperature sensor 122 so the thermometer 20 cannot measure the temperature of the subject. When the probe 22 is inserted into the subject but not received in the probe cover 32, the probe sensor 130 detects a first change from the idle condition. And when the probe 22 is inserted into the subject and received in the probe cover 32, the probe sensor 130 detects a second change from the idle condition that is different from the first change. Thus, the probe sensor 130 is configured to identify when the probe is inserted into a subject with or without a probe cover disposed over the probe.

Figure 6:
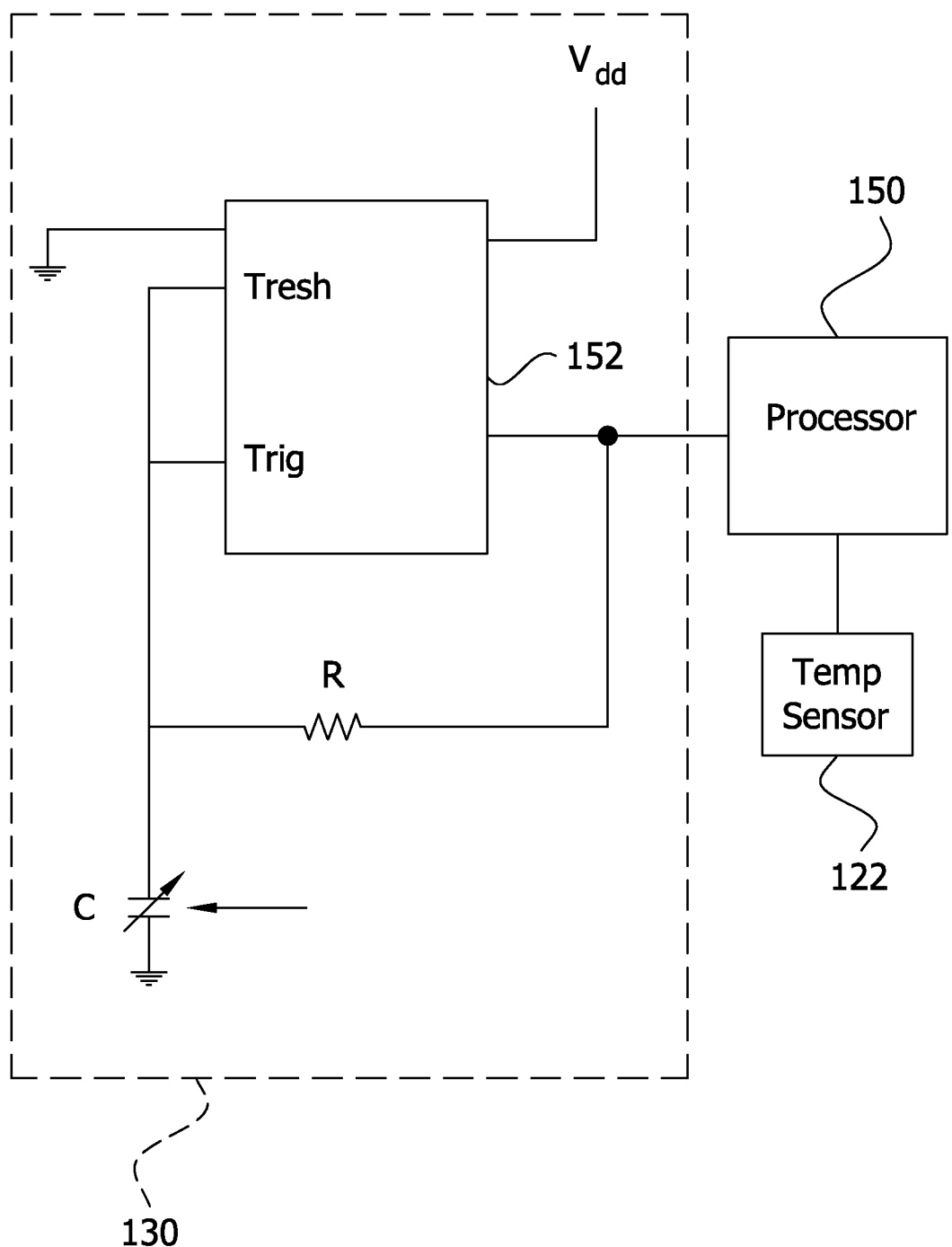
FIG. 6 is a circuit schematic of a probe condition detection system of the electronic thermometer.

The temperature sensor 122 and probe sensor 130 are operatively connected to a microprocessor system including a processor 150 (FIG. 6). The processor is programmed to perform the temperature measurements for determining the temperature of the subject through the connection between the processor 150 and the temperature sensor 122. The processor 150 also performs the probe condition detection for the thermometer 20 through the connection between the processor and the probe sensor 130. Although the processor 150 of the thermometer is described as controlling both the temperature measurements via the temperature sensor 122, and the probe sensor 130. Alternatively, a separate processor separate from the thermometer processor may control the probe sensor 130.

Figure 7:
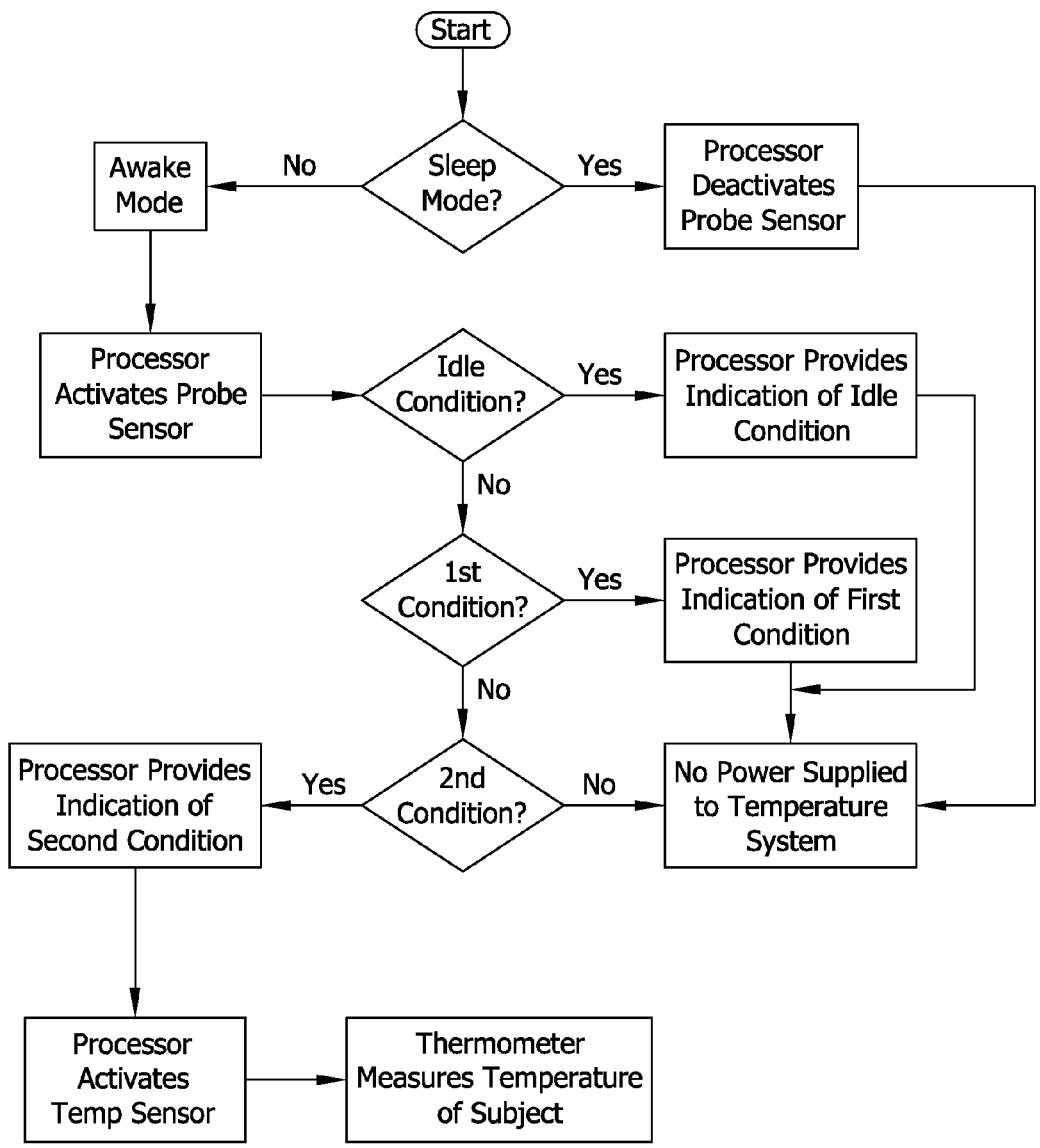
FIG. 7 is a flow chart showing a control sequence performed by a processor of the tympanic thermometer.

Referring to FIG. 7, in one embodiment the processor 150 controls the thermometer 20 so that when the thermometer is in the sleep mode, the processor will deactivate the probe sensor 130. And when the probe sensor 130 is deactivated, the processor 150 is programmed to prevent power from being supplied to the temperature sensor 122. Thus, the thermometer 20 would not be capable of performing a temperature measurement. However, when the thermometer 20 is in the awake mode, the processor is operable to activate the probe sensor 130. In the awake mode, if the processor 150 identifies the idle condition the power supply will remain cut-off from the temperature sensor 122.

The processor 150 can also be programmed to identify a first condition corresponding to the first change from the idle condition wherein the probe 22 is inserted into the subject without the probe cover 32, and a second condition corresponding to the second change from the idle condition wherein the probe is inserted into the subject with the probe cover. In one embodiment, processor 150 is programmed to activate the temperature sensor 122 to measure the temperature of the subject only after the processor identifies the second condition. The second condition corresponds to, for example, probe sensor 130 measuring a change in condition from the idle condition that is within a predetermined range, which indicates that the probe 22 is received in the probe cover 32 and inserted into the subject. This improves the accuracy of the thermometer 20 because power is not supplied to the temperature sensor 122 until the probe 22 is properly inserted into the subject. Also, external effects on the temperature sensor 122 are minimized making the temperature readings produced by the temperature sensor more accurate.

The processor 150 can also be programmed to provide an indication, such as a read-out on a display 30 of the thermometer 20, notifying the practitioner which condition is being detected by the processor 150. However, the indications can be provided in other ways such as audible indications without departing from the scope of the invention.

The processor 150 can also be programmed to trigger an alarm when the processor identifies the first condition wherein the probe 22 is inserted into the subject without a probe cover. For instance, a flashing light may be displayed on the display 30 of the thermometer 20 indicating to the practitioner that the probe 22 has been improperly inserted into the subject. If the processor 150 identifies this first condition, the thermometer 20 will continue to prevent power from being supplied to the temperature sensor 122 so that the thermometer cannot measure the temperature of the subject. The display 30 may further prompt the practitioner to clean the probe 22 before properly reinserting the probe into the patient with a probe cover. By alerting the practitioner to clean the probe 22 and place a probe cover over the probe before the thermometer 20 is used again, the potential cross-contamination that occurs when the thermometer is used after it has been inserted into a subject without a probe cover is minimized.

In the first illustrated embodiment, the probe sensor 130 comprises a capacitive electronic sensor component C (FIG. 6). Thus, the capacitive sensor 130 measures a capacitance at the distal end of the probe 22. The capacitive sensor 130 has an idle capacitance when the probe 22 is not inserted into the subject. When the probe 22 is inserted into the subject and not received in the probe cover 32, the capacitive sensor 130 undergoes a first change in capacitance. This first change in capacitance is caused by a change in capacitance value as a result of the probe being in direct contact with the subject.

When the probe 22 is received in the probe cover 32 and inserted into the subject, the capacitive sensor 130 undergoes a second change in capacitance, however, not as large in magnitude as the first change. This second change in capacitance is caused by a smaller increase in capacitance due to the insulating layer created by the probe cover material. As described above, the changes in capacitance can be monitored through the display 30.

A circuit schematic of the probe sensor 130 is illustrated in FIG. 6. The probe 22 is shown as a capacitor C. As will be understood by a person having skill in the art, a timer 152 (e.g., a 555 timer IC) generates a pulse which is modified by a change in capacitance across the capacitor C. The modified pulse is read by the processor 150 to determine the condition of the probe 22 as described above. By way of example, the pulse read by the processor 150 is measured in hertz (Hz) so that a pulse of about 1200 Hz corresponds to a change in capacitance at the probe 22 of about 20.1 pF. This change signals to the processor 150 that the probe is in the first condition wherein the probe is inserted into the subject without the probe cover 32. And a pulse of about 200 Hz corresponds to a change in capacitance at the probe 22 of about 121 pF. By comparison, this change signals to the processor 150 that the probe is in the second condition wherein the probe is inserted into the subject with the probe cover 32. The pulse frequencies and capacitance corresponding to the first and second conditions can have other values without departing from the scope of the invention.

FIG. 6 discloses one embodiment of a circuit that can be used to measure capacitance. However, other methods of monitoring the change in capacitance, including a circuit that measures voltage change, are also within the scope of the invention. Further, the disclosed circuit or any other circuit for monitoring capacitance can also be used in other types of thermometers such as oral and rectal thermometers without departing from the scope of the invention.

The processor can also be programmed to activate the temperature sensor 122 to measure the temperature of the subject only after the processor identifies the second condition wherein the probe 22 is received in the probe cover 32 and inserted into the subject. This improves the accuracy of the thermometer 20 because power is not supplied to the temperature sensor 122 until the probe 22 is properly inserted into the subject. Also, external effects on the temperature sensor 122 are minimized making the temperature readings produced by the temperature sensor more accurate.

Referring to FIG. 8, a probe sensor 230 of a second embodiment comprises external isolated layers mounted on a tip of the probe 222. The layers in the illustrated embodiment comprise a non-conductive layer 253 disposed over the probe tip and a conductive layer 255 disposed over the non-conductive layer. The non-conductive layer 253 is sandwiched between the conductive layer 255 and metal probe tip so that they function as a capacitor for measuring a capacitance at the probe as described above. By way of example, the non-conductive layer 253 is formed from a plastic material and the conductive layer 255 is formed from a metallic material. It will be understood that other configurations for the probe sensor are also within the scope of the present invention.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An electronic thermometer comprising: a probe adapted to be heated by a subject for use in measuring a temperature of the subject; at least one temperature sensor for detecting a temperature of the probe; a probe sensor for detecting a condition at the probe, the probe sensor having an idle condition when the probe is not inserted into the subject; and
   a processor operatively connected to the probe sensor and programmed to monitor a change in the condition of the probe sensor from the idle condition to an active condition wherein the probe has been received in a probe cover and inserted into the subject;
   wherein the processor is operatively connected to the at least one temperature sensor and programmed to activate the at least one temperature sensor only after the probe sensor detects a change in condition from the idle condition to the active condition indicating that the probe is received in a probe cover and inserted into the subject.

2. An electronic thermometer as set forth in claim 1 wherein the probe sensor is a capacitive sensor that measures a capacitance at the probe, the capacitive sensor having an idle capacitance when the probe is not inserted into the subject, the processor being programmed to activate the at least one temperature sensor only after the capacitive sensor detects a change in capacitance from the idle capacitance within a predetermined range indicating that the probe is received in a probe cover and inserted into the subject.

3. An electronic thermometer as set forth in claim 2 wherein the processor is programmed to identify a first condition corresponding to a first change in capacitance detected by the capacitive sensor signaling that the probe has been inserted into the subject without a probe cover disposed over the probe, and a second condition corresponding to a second change in capacitance detected by the capacitive sensor different from the first change in capacitance signaling that the probe has been inserted into the subject with a probe cover disposed over the probe.

4. An electronic thermometer as set forth in claim 3 wherein the first change in capacitance is larger than the second change in capacitance.

5. An electronic thermometer as set forth in claim 3 wherein the processor is programmed to trigger an alarm when the processor identifies the first condition.

6. An electronic thermometer as set forth in claim 2 wherein the capacitive sensor is disposed at a distal end of the probe.

7. An electronic thermometer as set forth in claim 1 wherein the thermometer is a tympanic thermometer.

8. An electronic thermometer as set forth in claim 1 wherein the probe sensor comprises external isolated layers mounted on a tip of the probe.

9. An electronic thermometer as set forth in claim 8 wherein the external isolated layers comprise a non-conductive layer disposed over the probe tip and a conductive layer disposed over the non-conductive layer.

10. A method of determining a temperature of a subject with an electronic thermometer, said thermometer having a probe adapted to be heated by a subject and at least one temperature sensor for detecting a temperature of the probe, said method comprising:
    detecting a condition at the probe of the thermometer with a probe sensor, said probe sensor having an idle condition when the probe is not inserted into the subject; and
    monitoring a change in the condition of the probe sensor from the idle condition to an active condition wherein the probe has been received in a probe cover and inserted into the subject;
    and detecting the temperature of the probe inserted into the subject by using the temperature sensor to determine the temperature of the subject;
    wherein the thermometer comprises a processor operatively connected to the temperature sensor, the method further comprising activating the temperature sensor using the processor for determining the temperature of the subject only after the probe sensor detects a change in condition from the idle condition to the active condition indicating that the probe is received in a probe cover and inserted into the subject.

11. A method as set forth in claim 10 wherein the probe sensor is a capacitive sensor that measures a capacitance at the probe, the capacitive sensor having an idle capacitance when the probe is not inserted into the subject, the processor being programmed to activate the temperature sensor only after the capacitive sensor detects a change in capacitance from the idle capacitance within a predetermined range indicating that the probe is received in a probe cover and inserted into the subject.

12. A method as set forth in claim 11 further comprising programming the processor to identify a first condition corresponding to a first change in capacitance detected by the capacitive sensor signaling that the probe has been inserted into the subject without a probe cover disposed over the probe, and a second condition corresponding to a second change in capacitance detected by the capacitive sensor different from the first change in capacitance signaling that the probe has been inserted into the subject with a probe cover disposed over the probe.

13. A method as set forth in claim 12 wherein the first change in capacitance is larger than the second change in capacitance.

14. A method as set forth in claim 12 further comprising triggering an alarm to prompt a practitioner to clean the probe and place a probe cover over the probe when the processor identifies the first condition.

15. A method of determining a temperature of a subject with an electronic thermometer, said method comprising:
    measuring a condition at a probe of the thermometer with a probe sensor, said probe sensor having an idle condition when the probe is not inserted into the subject;
    programming a processor of the thermometer to identify a first condition corresponding to a first change in condition measured by the probe sensor signaling that the probe has been inserted into the subject without a probe cover disposed over the probe, and a second condition corresponding to a second change in condition measured by the probe sensor different from the first change in condition signaling that the probe has been inserted into the subject with a probe cover disposed over the probe;

and detecting a temperature of the probe inserted into the subject by using a temperature sensor to determine the temperature of the subject;

wherein the probe sensor is a capacitive sensor that measures a capacitance at the probe, the capacitive sensor having an idle capacitance when the probe is not inserted into the subject, wherein the first condition corresponds to a first change in capacitance measured by the capacitive sensor signaling that the probe has been inserted into the subject without a probe cover disposed over the probe, and the second condition corresponds to a second change in capacitance measured by the capacitive sensor different from the first change in capacitance signaling that the probe has been inserted into the subject with a probe cover disposed over the probe; and wherein the processor is operatively connected to at least one temperature sensor for determining the temperature of the subject, the method further comprising activating the at least one temperature sensor only after the probe sensor detects the second condition.

16. A method as set forth in claim 15 wherein the first change in capacitance is larger than the second change in capacitance.

17. A method as set forth in claim 15 further comprising programming the processor to trigger an alarm and prompt a practitioner to clean the probe and place a probe cover over the probe when the processor identifies the first condition.

* * * * *